(12) United States Patent
Vidarsson

(10) Patent No.: US 6,605,251 B1
(45) Date of Patent: Aug. 12, 2003

(54) LUBRICANT FOR METALLURGICAL POWDER COMPOSITION

(75) Inventor: Hilmar Vidarsson, Höganäs (SE)

(73) Assignee: Höganäs AB, Höganäs (SE)

( * ) Notice: Subject to any disclaimer, the term of this patent is extended or adjusted under 35 U.S.C. 154(b) by 0 days.

(21) Appl. No.: 09/512,290

(22) Filed: Feb. 24, 2000

Related U.S. Application Data

(63) Continuation of application No. PCT/SE98/01566, filed on Sep. 1, 1998.

(30) Foreign Application Priority Data

Sep. 7, 1997 (SE) ............................................. 9703151

(51) Int. Cl.$^7$ .................................................. B22F 1/00
(52) U.S. Cl. .............................. 419/36; 419/37; 75/255
(58) Field of Search ............................. 75/255; 419/36, 419/37

(56) References Cited

U.S. PATENT DOCUMENTS

| | | | |
|---|---|---|---|
| 4,483,905 A | | 11/1984 | Engström |
| 4,676,831 A | | 6/1987 | Engström |
| 4,765,950 A | | 8/1988 | Johnson |
| 4,834,800 A | | 5/1989 | Semel |
| 4,891,399 A | | 1/1990 | Ohkawa et al. |
| 4,911,630 A | | 3/1990 | Uehara |
| 4,973,626 A | * | 11/1990 | Wilkus et al. ............... 525/104 |
| 5,055,128 A | * | 10/1991 | Kiyota et al. .................. 75/246 |
| 5,063,011 A | | 11/1991 | Rutz et al. |
| 5,091,346 A | | 2/1992 | Inoue et al. |
| 5,198,137 A | | 3/1993 | Rutz et al. |
| 5,554,338 A | * | 9/1996 | Sugihara et al. ................ 419/5 |
| 5,594,186 A | | 1/1997 | Krause et al. |
| 5,922,978 A | * | 7/1999 | Carroll ........................ 75/240 |
| 6,140,278 A | * | 10/2000 | Thomas et al. ............. 508/150 |
| 6,280,683 B1 | * | 8/2001 | Hendrickson et al. ........ 419/37 |
| 6,316,393 B1 | * | 11/2001 | Thomas et al. ............. 508/312 |

FOREIGN PATENT DOCUMENTS

| | | |
|---|---|---|
| DE | 2459475 A1 | 7/1975 |
| EP | 0300039 | 1/1989 |
| EP | 0311407 | 4/1989 |

OTHER PUBLICATIONS

Condensed Chemical Dictionary (CDC), 10th ed., pp. 836, 830–831, 1981.*

* cited by examiner

*Primary Examiner*—Daniel J. Jenkins
(74) *Attorney, Agent, or Firm*—Burns, Doane, Swecker & Mathis, L.L.P.

(57) ABSTRACT

This invention relates to a lubricant for metallurgical powder compositions. According to the invention, the lubricant contains a polyolefine-based polymer, which has a weight-average molecular weight Mw of 500–10000. The invention further concerns a metal-powder composition containing the lubricant, method for making sintered products by using the lubricant, and use of the same in cold and warm compaction.

19 Claims, No Drawings

LUBRICANT FOR METALLURGICAL POWDER COMPOSITION

This is a continuation of International Application No. PCT/SE98/01566, filed Sep. 1, 1988, that designates the United States of America and which claims priority from Swedish Application No. 9703151-2, filed Sep. 1,1997.

This invention relates to a lubricant for metallurgical powder compositions, as well as a metal-powder composition containing the lubricant. The invention further concerns a method for making sintered products by using the lubricant, as well as use of the lubricant in a metal-powder composition in compaction. More specifically, the invention concerns lubricants which when pressed result in products having high transverse rupture strength. The lubricant according to the invention further has the advantage that it can be used for both warm and cold compaction.

In industry, the use of metal products manufactured by compacting and sintering metal-powder compositions is becoming increasingly widespread. A number of different products of varying shape and thickness are being produced, and the quality requirements placed on these products are that the manufactured metal products have high density as well as high strength.

In metal compaction, different standard temperature ranges are used. Thus, cold pressing is predominantly used for compacting metal powder (the powder has room temperature). Both cold pressing and warm pressing require the use of a lubricant.

Compaction at temperatures above room temperature has evident advantages, yielding a product of higher density and higher strength than compaction performed at lower temperatures.

Most of the lubricants used in cold compaction cannot be used in high-temperature compaction, since they seem to be effective within a limited temperature range only. An ineffective lubricant considerably increases the wear of the compacting tool.

How much the tool is worn is influenced by various factors, such as the hardness of the material of the tool, the pressure applied, and the friction between the compact and the wall of the tool when the compact is compacted and ejected. The latter factor is strongly linked to the lubricant used.

The ejection force is the force required for ejecting the compact from the tool. Since a high ejection force not only increases the wear of the compacting tool but may also damage the compact, this force should preferably be reduced.

However, the use of a lubricant may create problems in compaction, and it is therefore important that the lubricant is well suited to the type of compaction carried out.

In order to perform satisfactorily, the lubricant should be forced out of the pore structure of the powder composition in the compacting operation, and into the interspace between the compact and the tool, thereby lubricating the walls of the compaction tool. By such lubrication of the walls of the compaction tool, the ejection force is reduced.

Another reason why the lubricant has to emerge from the compact is that it would otherwise create pores in the compact after sintering. It is well-known that large pores have an adverse effect on the dynamic strength properties of the product.

An object of the new lubricant according to the present invention is to make it possible to manufacture compacted products having high transverse rupture strength, high green density, as well as sintered products having high sintered density and low ejection force from the lubricant in combination with metal powders. As the compact is subject to considerable stresses when ejected from the compacting tool and as the product must keep together during the handling between compaction and sintering without cracking or being otherwise damaged, it is important with high transverse rupture strength. This is especially important in the case of thin parts.

The lubricant according to the invention contains a polyolefine-based polymer, which has a weight-average molecular weight $M_w$ of 500–10 000. Polyolefins are a group of thermoplastic polymers with different degrees of crystallinity. Polyolefins are subdivided into simple polyolefins, poly($\alpha$-olefins) and copolymers based on olefins and/or $\alpha$-olefins. The copolymers may also include other types of comonomers such as vinylacetates, acrylates, styrenes, etc. Poly($\alpha$-olefins) include polymers such as polypropylene and poly(1-butene). Simple polyolefines, however, include polymers such as branched chain low-density polyethylene and linear chain high-density polyethylene. Linear chain polyethylenes of relatively low molecular weight are termed polyethylene waxes.

The polymer according to the invention is preferably a polyethylene wax. The lubricant according to the invention can be used in both cold and warm compaction, but in warm compaction the weight-average molecular weight $M_w$ of the lubricant preferably is 1000–10 000.

Preferably, the lubricant of the invention has a polydispersity $M_w/M_n$ lower than 2.5, preferably lower than 1.5.

The invention further concerns a metal-powder composition containing a metal powder and the above-mentioned lubricant, as well as methods for making sintered products, both cold and warm compaction. The method for cold compaction according to the invention comprises the steps of a) mixing a metal powder and a lubricant to a metal-powder composition b) compacting the metal-powder composition to a compacted body, and c) sintering the compacted body, use being made of a lubricant according to the invention, which has a weight-average molecular weight $M_w$ of 500–10 000.

The method for warm compaction according to the invention comprises the steps of a) mixing a metal powder and a lubricant to a metal-powder composition, b) preheating the metal-powder composition to a predetermined temperature, c) compacting the heated metal-powder composition in a heated tool, and d) sintering the compacted metal-powder composition, use being made of a lubricant according to the invention, which has a weight-average molecular weight $M_w$ of 1000–10 000.

The present invention further relates to the use of the lubricant according to the invention in a metallurgical powder composition in cold and warm compaction.

The lubricant can make up 0.1–2.0% by weight of the metal-powder composition according to the invention, preferably 0.2–0.8% by weight, based on the total amount of the metal-powder composition. The possibility of using the lubricant according to the present invention in low amounts is an especially advantageous feature of the invention since it permits that compacts and sintered products having high densities can be achieved cost-effectively.

As used in the description and the appended claims, the expression "metal powder" encompasses iron-based powders essentially made up of iron powders containing not more than about 1.0% by weight, preferably not more than about 0.5% by weight, of normal impurities. Examples of such highly compressible, metallurgical-grade iron powders are the ANCORSTEEL 1000 series of pure iron powders, e.g. 1000, 1000B and 1000C, available from Hoeganaes Corporation, Riverton, N.J. and similar powders available from Höganäs AB, Sweden. For example, ANCORSTEEL 1000 iron powder, has a typical screen profile of about 22% by weight of the particles below a No. 325 sieve (U.S. series) and about 10% by weight of the particles larger than a No. 100 sieve with the remainder between these two sizes (trace amounts larger than No. 60 sieve). The ANCORSTEEL 1000 powder has an apparent density of about 2.85–3.00 g/cm$^3$, typically 2.94 g/cm$^3$. Other iron powders that can be used in the invention are typical sponge iron powders, such a Hoeganaes' ANCOR MH-100 powder.

The iron-based powders can also include iron, preferably substantially pure iron, that has been prealloyed, diffusion bonded, or admixed with one or more alloying elements. Examples of alloying elements that can be combined with the iron particles include, but are not limited to, molybdenum; manganese; magnesium; chromium; silicon; copper; nickel; gold; vanadium; columbium (niobium); graphite; phosphorus; aluminium; binary alloys of copper and tin or phosphorus; Ferro-alloys of manganese, chromium, boron, phosphorus, or silicon; low melting ternary and quaternary eutectics of carbon and two or three of iron, vanadium, manganese, chromium, and molybdenum; carbides of tungsten or silicon; silicon nitride; aluminium oxide; and sulphides of manganese or molybdenum, and combinations thereof. Typically, the alloying elements are generally combined with the iron powder, preferably the substantially pure iron powder in an amount of up to about 7% by weight, more preferably from about 0.25% to about 5% by weight, more preferably from about 0.25% to about 4% by weight, although in certain specialised uses the alloying elements may be present in an amount of from about 7% to about 15% by weight, of the iron powder and alloying element.

The iron-based powders can thus include iron particles that are in admixture with the alloying elements that are in the form of alloying powders. The term "alloying powder" as used herein refers to any particulate element or compound, as previously mentioned, physically blended with the iron particles, whether or not that element or compound ultimately alloys with the iron powder. The alloying-element particles generally have a weight average particle size below about 100 microns, preferably below about 75 microns, more preferably below about 30 microns. Binding agents are preferably included in admixtures of iron particles and alloying powders to prevent dusting and segregation of the alloying powder from the iron powder. Examples of commonly used binding agents include those set forth in U.S. Pat. Nos. 4,483,905 and 4,676,831, both to Engstrom, and in U.S. Pat. No. 4,834,800 to Semel, all of which are incorporated by reference herein in their entireties.

The iron-based powder can further be in the form of iron that has been pre-alloyed with one or more of the alloying elements. The pre-alloyed powders can be prepared by making a melt of iron and the desired alloying elements, and then atomising the melt, whereby the atomised droplets form the powder upon solidification. The amount of the alloying element or elements incorporated depends upon the properties desired in the final metal part. Pre-alloyed iron powders that incorporate such alloying elements are available from Hoeganaes Corp. as part of its ANCORSTEEL line of powders.

A further example of iron-based powders is diffusion-bonded iron-based powder, which contains particles of substantially pure iron that have the alloying elements set forth above diffusion-bonded to their outer surfaces. Such commercially available powders include DISTALOY 4600A diffusion-bonded powder available from Hoeganaes Corporation, which contains about 1.8% nickel, about 0.55% molybdenum, and about 1.6% copper, and DISTALOY 4800A diffusion bonded powder available from Hoeganaes Corporation, which contains about 4.05% nickel, about 0.55% molybdenum, and about 1.6% copper. Similar grade powders are also available from Höganäs AB, Sweden.

A preferred iron-based powder is made of iron pre-alloyed with molybdenum (Mo). The powder is produced by atomising a melt of substantially pure iron containing from about 0.5% to about 2.5% by weight of Mo. An example of such a powder is Hoeganaes ANCORSTEEL 85HP steel powder, which contains about 0.85% by weight of Mo, less than about 0.4% by weight, in total, of such other materials as manganese, chromium, silicon, copper, nickel, molybdenum or aluminium, and less than about 0.02% by weight of carbon. Another example of such a powder is Hoeganaes ANCORSTEEL 4600V steel powder, which contains about 0.5–0.6% by weight of molybdenum, about 1.5–2.0% by weight of nickel, and about 0.1–0.25% by weight of manganese, and less than about 0.02% by weight of carbon.

Another pre-alloyed iron-based powder that can be used in the invention is disclosed in U.S. Pat. No. 5,108,93 to Causton, entitled "Steel Powder Admixture Having Distinct Pre-alloyed Powder of Iron Alloys", which is herein incorporated in its entirety. This steel powder composition is an admixture of two different pre-alloyed iron-based powders, one being a pre-alloy of iron with 0.5–2.5% by weight of molybdenum, the other being a pre-alloy of iron with carbon and with at least about 25% by weight of a transition element component, wherein this component comprises at least one element selected from the group consisting of chromium, manganese, vanadium, and columbium. The admixture is in proportions that provide at least about 0.05% by weight of the transition element component to the steel powder composition. An example of such a powder is commercially available as Hoeganaes ANCORSTEEL 41 AB steel powder, which contains about 0.85% by weight of molybdenum, about 1% by weight of nickel, about 0.9% by weight of manganese, about 0.75% by weight of chromium, and about 0.5% by weight of carbon.

Other iron-based powders that are useful in the practice of the invention are ferromagnetic powders. An example is a composition of substantially pure iron powders in admixture with powder of iron that has been pre-alloyed with small amounts of phosphorus.

Still further iron-based powders that are useful in the practice of the invention are iron particles coated with a thermoplastic material to provide a substantially uniform coating of the thermoplastic material as described in U.S. Pat. No. 5,198,137 to Rutz et al., which is incorporated herein in its entirety. Preferably, each particle has a substantially uniform circumferential coating about the iron core particle. Sufficient thermoplastic material issued to provide a coating of about 0.001–15% by weight of the iron particles as coated. Generally the thermoplastic material is present in an amount of at least 0.2% by weight, preferably about 0.4–2% by weight, and more preferably about 0.6–0.9% by weight of the coated particles. Preferred are thermoplastics such as polyethersulfones, polyetherimides, polycarbonates, or polyphenylene ethers, having a weight average molecular weight in the range of about 10 000 to 50 000. Other polymeric coated iron-based powders include those containing an inner coating of iron phosphate as set forth in U.S. Pat. No. 5,063,011 to Rutz et al., which is incorporated herein in its entirety.

The particles of pure iron, pre-alloyed iron, diffusion-bonded iron, or thermoplastic coated iron can have a weight average particle size as small as 1 μm or below, or up to about 850–1000 μm, but generally the particles will have a weight average particle size in the range of about 10–500 μm. Preferred are those having a maximum number average particle size up to about 350 μm, preferably 50–150 μm.

Apart from the metal powder and the lubricant according to the invention, the metal-powder composition may contain one or more additives selected from the group consisting of binders, processing aids and hard phases. The binder may be added to the powder composition in accordance with the method described in U.S. Pat. No. 4,834,800 (which is hereby incorporated by reference) and be blended into the metal-powder compositions in amounts of from about 0.005–3% by weight, preferably about 0.05–1.5% by weight, and more preferably about 0.1–1% by weight, based on the weight of the iron and alloying powders.

The processing aids used in the metal-powder composition may consist of talc, forsterite, manganese sulphide, sulphur, molybdenum disulphide, boron nitride, tellurium, selenium, barium difluoride and calcium difluoride, which are used either separately or in combination.

The hard phases used in the metal-powder composition may consist of carbides of tungsten, vanadium, titanium, niobium, chromium, molybdenum, tantalum and zirconium, nitrides of aluminium, titanium, vanadium, molybdenum and chromium, $Al_2O_3$, $B_4C$, and various ceramic materials.

With the aid of conventional techniques, the metal-powder and the lubricant particles are mixed to a substantially homogeneous powder composition.

Preferably, the lubricant according to the invention is added to the metal-powder composition in the form of solid particles. The average particle size of the lubricant may vary, but preferably is in the range of 3–150 μm.

If the particle size is too large, it becomes difficult for the lubricant to leave the pore structure of the metal-powder composition during compaction and the lubricant may then give rise to large pores after sintering, resulting in a compact showing impaired strength properties.

In cold compaction according to the invention the steps are the following:
 a) mixing a metal powder and a lubricant according to the invention, which contains a polyolefine-based polymer, which has a weight-average molecular weight $M_w$ of 500–10 000 to a metal-powder composition,
 b) compacting the metal-powder composition to a compacted body, and
 c) sintering the compacted body.

In the cold compaction according to the invention it is preferable to heat the compacted body before step c) to a temperature above the melting point peak of the lubricant during a sufficient period of time for obtaining essentially the same temperature in the entire compacted body. With this treatment the compacted body, not yet sintered, is provided with a high transverse rupture strength, which facilitates the handling and processing of the compacted body between compaction and sintering without cracking or being otherwise damaged. As will be apparent from the tests below, these enhanced transverse rupture strengths are not gained with the use of examples of commercially available lubricants for cold compaction, which makes the lubricant according to the invention special.

In warm compaction according to the invention, the metal powder composition is advantageously preheated before being supplied to the preheated compaction tool. In such preheating of the metal powder composition, it is of importance that the lubricant does not begin to soften or melt, which would make the powder composition difficult to handle when filling the compaction tool, which in turn results in a compacted body having a non-uniform density and poor reproducibility of part weights. Moreover, it is important that no partial premelting of the lubricant occurs, i.e. the lubricant should be a uniform product. Therefore, it is important that the polydispersity $M_w/M_n$ is lower than 2.5, and preferably lower than 1.5.

The steps of the warm compaction process are the following:
 a) mixing a metal powder and a lubricant according to the invention, which contains a polyolefine-based polymer with a weight-average molecular weight $M_w$ of 1000–10 000;
 b) preheating the mixture to a predetermined temperature, preferably to a temperature below the melting point peak of the lubricant;
 c) transferring the heated powder composition to a die, which is heated to a temperature of preferably a temperature of the melting point peak of the lubricant or below; and compacting the composition; and
 d) sintering the compacted metal-powder composition In step b) of the method, the metal powder composition is preferably preheated to a temperature of 5–50° C. below the melting point of the polymer.

A few tests will now be accounted for in order to illustrate that the invention is effective and yields products of high green density as well as high transverse rupture strength.

Test 1

Table 1 below states a number of lubricants by indicating melting point peak, weight-average molecular weight $M_w$, polydispersity ($M_w/M_n$), measured green density (GD) and ejection force (Ej.F) in cold compaction of ASC 100.29 (marketed by Höganäs AB) mixed with 0.5% by weight of graphite, 2% by weight of Cu-200, and 0.6% by weight of lubricant. The compaction pressure was 600 MPa.

TABLE 1

Lubricants in cold compaction

| Lubricant | Mw (g/mol) | Mw Mn | GD (g/cm$^2$) | Ej.F (N/mm$^2$) | Melting point peak (° C.) |
|---|---|---|---|---|---|
| PEW 3700 | 3700 | 2.6 | 7.11 | 22.0 | 125 |
| PEW 2000 | 2000 | 1.1 | 7.12 | 18.4 | 126 |
| EBS-wax* | — | — | 7.18 | 17.8 | 144 |

*outside the scope of the invention

PEW 3700 is a polyethylene wax within the scope of the invention.

PEW 2000 is a polyethylene wax within the scope of the invention.

EBS-wax is an ethylene-bis-stearamide-wax.

The green density was measured according to ISO 3927 1985, and the ejection force was measured according to Höganäs Method 404.

The melting point peaks for the lubricants are indicated as the peak values of the melting curve, which was measured with the aid of Differential Scanning Calorimetry (DSC) technique on a Model 912S DSC instrument available from TA Instruments, New Castle, Del. 197 201 USA.

As appears from table 1, similar green densities can be attained, and the same low ejection force remains with the lubricant having the lower $M_w/M_n$ (PEW 2000) according to the invention as with EBS-wax.

Test 2

Table 2 below states a comparison of lubricant PEW 2000 and EBS-wax concerning heating of the compacted body before sintering, whereby the compacted body is heated to a temperature above the melting point peak of the lubricant during a sufficient period of time for obtaining essentially the same temperature in the entire compacted body.

The metal-powder compositions contained the following ingredients.

Composition 1 (invention)

ASC 100.29, marketed by Höganäs AB 2.0% by weight CU-200

0.5% by weight graphite 0.6% PEW 2000

Composition 2 (EBS-wax)

ASC 100.29, marketed by Höganäs AB 2.0% by weight Cu-2000

0.5% by weight graphite 0.8% EBS-wax

TABLE 2

Compacted bodies heat treated before sintering

| Composition | Comp. Press MPa | GD g/cm³ | TRS MPa |
|---|---|---|---|
| 1 | 600 | 7.10 | 23 |
| 2 | 600 | 7.06 | 13 |
| 1*1 | 600 | 7.10 | 39 |
| 2*2 | 600 | 7.05 | 17 |

*1 Heat treated to a temperature of 150° C. for 60 min.
*2 Heat treated to a temperature of 150° C. for 60 min.

As appears from table 2, the transverse rupture strength (TRS) is considerably enhanced by the heat treatment of the green compacted body of composition 1, while the transverse rupture strength of the green compacted body of composition 2 is not enhanced significantly by the heat treatment.

The enhanced transverse rupture strength provides a green compacted body, which can be handled and processed before sintering. This possibility is most desirable in many areas.

Test 3

Table 3 below states a number of lubricants by indicating melting point peak, weight-average molecular weight $M_w$, polydispersity ($M_w/M_n$), compaction pressure (Comp. Press.), measured green density (GD) and ejection energy (Ej.En.) in cold compaction of ASC 100.29 (marketed by Höganäs AB) mixed with 0.45% by weight of lubricant and 0.15% methacrylate binder.

TABLE 3

Lubricants in bonded metal composition in cold compaction

| Lubricant | $M_w$ (g/mol) | $M_w/M_n$ | Comp. press. (MPa) | GD (g/cm²) | Ej.En. (J/cm²) | Melting point peak (° C.) |
|---|---|---|---|---|---|---|
| PEW 655 | 655 | 1.08 | 600 | 7.07 | 32.38 | 99 |
| " | " | " | 800 | 7.21 | 38.91 | " |
| PEW 1000 | 1000 | 1.08 | 600 | 7.07 | 34.99 | 113 |
| " | " | " | 800 | 7.21 | 41.88 | " |

TABLE 3-continued

Lubricants in bonded metal composition in cold compaction

| Lubricant | $M_w$ (g/mol) | $M_w/M_n$ | Comp. press. (MPa) | GD (g/cm²) | Ej.En. (J/cm²) | Melting point peak (° C.) |
|---|---|---|---|---|---|---|
| PEW 2000 | 2000 | 1.1 | 600 | 7.06 | 36.21 | 126 |
| " | " | " | 800 | 7.22 | 48.46 | " |
| PEW 3000 | 3000 | 1.1 | 600 | 7.07 | 37.69 | 129 |
| " | " | " | 800 | 7.22 | 45.33 | " |
| EBS-wax* | — | — | 600 | 7.16 | 47.42 | 144 |
| " | — | — | 800 | 7.28 | 59.20 | " |

*outside the scope of the invention

PEW 655, PEW 1000, PEW 2000, and PEW 3000 are all lubricants according to the invention and are polyethylene waxes.

As appears from table 3, the ejection energies are lower for the lubricants according to the invention than for the lubricant outside the scope of the invention.

Test 4

Table 4 below states a number of lubricants by indicating melting point peak, powder temperature, tool temperature and green density (GD) and ejection force (Ej.F).

The metal-powder compositions contained the following ingredients:

Distaloy®AE, marketed by Höganäs AB 0.3% by weight of graphite 0.6% by weight of lubricant according to table 4. The compaction pressure was 600 MPa.

TABLE 4

Lubricants in warm compaction

| Lubricant | Melting point peak (° C.) | Powder temp (° C.) | Tool temp (° C.) | GD g/cm² | Ej.F (N/mm²) |
|---|---|---|---|---|---|
| PEW 3000 | 129 | 110 | 110 | 7.28 | 20.5 |
| " | " | 110 | 120 | 7.29 | 21.3 |
| *Lubricant X1 | 176 | 150 | 150 | 7.22 | 15.0 |

*Lubricant X1 is a lubricant according to PCT/E95/00636, which essentially consists of an oligomer of amide type with a weight-average molecular weight, Mw, of 18 000.

As appears from table 4, the green density (GD) is slightly higher with the lubricant according to the invention. The ejection force is higher with the lubricant according to the invention, but is still low enough to be acceptable.

Compared to the material containing EBS-wax or lubricant X1, the materials admixed with lubricants according to the invention give comparable green density (GD) and ejection forces (Ej.F).

When a cold compacted body, where the material was admixed with lubricants according to the invention, is heat treated before sintering, it gains an enhanced green strength as compared to a material admixed with EBS-wax. The enhanced green strength makes it possible to process and handle the compacted body before sintering without cracking or being otherwise damaged.

What is claimed is:

1. A metal-powder composition for compaction containing metal powder and a lubricant comprising a polyolefin polymer which has a weight-average molecular weight $M_w$ of 500 to 10,000, said lubricant having a polydispersity $M_w/M_n$ lower than 2.5.

2. The metal-powder composition as claimed in claim 1, wherein the polyolefin polymer is a polyethylene wax.

3. The metal-powder composition as claimed in claim 1, further containing one or more additives selected from the group consisting of binding agents, processing aids, alloying elements, and hard phases.

4. The metal-powder composition as claimed in claim 1, further containing a binding agent and one or more additives selected from the group consisting of processing aids, alloying elements, and hard phases.

5. The metal-powder composition as claimed in claim 1, comprising a major amount of a metal powder consisting of an iron-based powder, and a minor amount of a solid lubricant comprising a polyolefin polymer, which has a weight-average molecular weight $M_w$ of 500 to 10,000.

6. The metal-powder composition as claimed in claim 5, wherein the lubricant makes up 0.1 to 2.0% by weight of the total composition.

7. A method for making sintered products, comprising the steps of:
   a) mixing a metal powder and a lubricant to a metal-powder composition;
   b) compacting the metal-powder composition to a compacted body;
   c) sintering the compacted body wherein the lubricant comprises a polyolefin polymer, which has a weight-average molecular weight $M_w$ of 500 to 10,000, said lubricant having a polydispersity $M_w/M_n$ lower than 2.5; and
   d) before step c), heating the compacted body to a temperature above the melting point peak of the polyolefin lubricant for a sufficient period of time to obtain essentially the same temperature in the entire compacted body.

8. A method for making sintered products, comprising the steps of:
   a) mixing a metal powder and a lubricant to a metal-powder composition,
   b) preheating the metal-powder composition to a predetermined temperature,
   c) compacting the heated metal-powder composition in a heated tool, and
   d) sintering the compacted metal-powder composition, wherein the lubricant comprises a polyolefin polymer, which has a weight-average molecular weight $M_w$ of 1,000 to 10,000.

9. The method as claimed in claim 8, wherein the metal-powder composition in step b) is preheated to a temperature below the melting point peak of the polyolefin polymer.

10. The method as claimed in claim 8, wherein the tool before step c) is heated to a temperature of the melting point peak of the polyolefin polymer or below.

11. A metal-powder composition for compaction containing metal powder and a lubricant comprising a polyolefin polymer, which has a weight-average molecular weight $M_w$ of 1,000 to 10,000, said lubricant having a polydispersity $M_w/M_n$ lower than 1.5.

12. The metal-powder composition as claimed in 5, wherein the lubricant makes up 0.2 to 0.8% by weight of the total composition.

13. The method as claimed in claim 8, wherein the metal-powder composition in step b) is preheated to a temperature of 5 to 50° C. below the melting point peak of the lubricant.

14. The method as claimed in claim 9, wherein the tool before step c) is heated to a temperature of the melting point peak of the polyolefin polymer or below.

15. The method as claimed in claim 8, wherein the tool before step c) is heated to a temperature of 5 to 50° C. below the melting point peak of the lubricant.

16. The method as claimed in claim 9, wherein the tool before step c) is heated to a temperature of 5 to 50° C. below the melting point peak of the lubricant.

17. A method of making sintered products, comprising:
   a) cold compacting the metal-powder composition of claim 5 to form a compacted body;
   b) after a), heating the compacted body to a temperature above the melting point peak of the lubricant and obtaining essentially the same temperature throughout the compacted body; and
   c) after b), sintering the compacted body.

18. A method of making sintered products, comprising:
   a) preheating the metal-powder composition of claim 1 without softening or melting the lubricant;
   b) placing the heated metal-powder composition in a tool which is at a temperature of the melting point peak of the lubricant or below;
   c) compacting the metal-powder composition in the tool to form a compacted body; and
   d) sintering the compacted body.

19. The method as claimed in claim 18, wherein the tool is at the melting point peak of the lubricant.

* * * * *